Nov. 5, 1968
JAMES E. WEBB
ADMINISTRATOR OF THE NATIONAL AERONAUTICS
AND SPACE ADMINISTRATION
ROCKET ENGINE THRUST VECTOR DEVIATION MEASUREMENT DEVICE
Filed Sept. 9, 1966
3,408,861
2 Sheets-Sheet 1
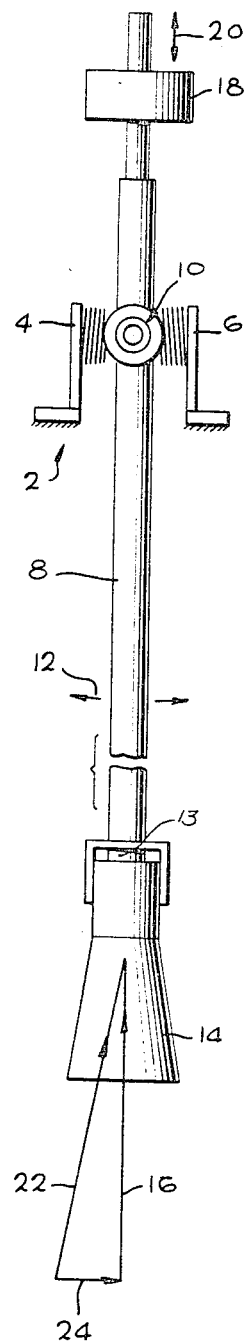
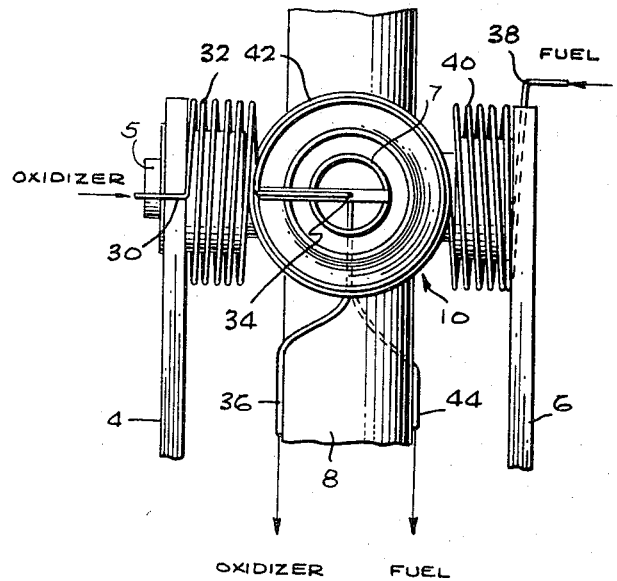
HERBERT SHIEBER
KIRKE LEONARD
INVENTORS
BY
ATTORNEYS

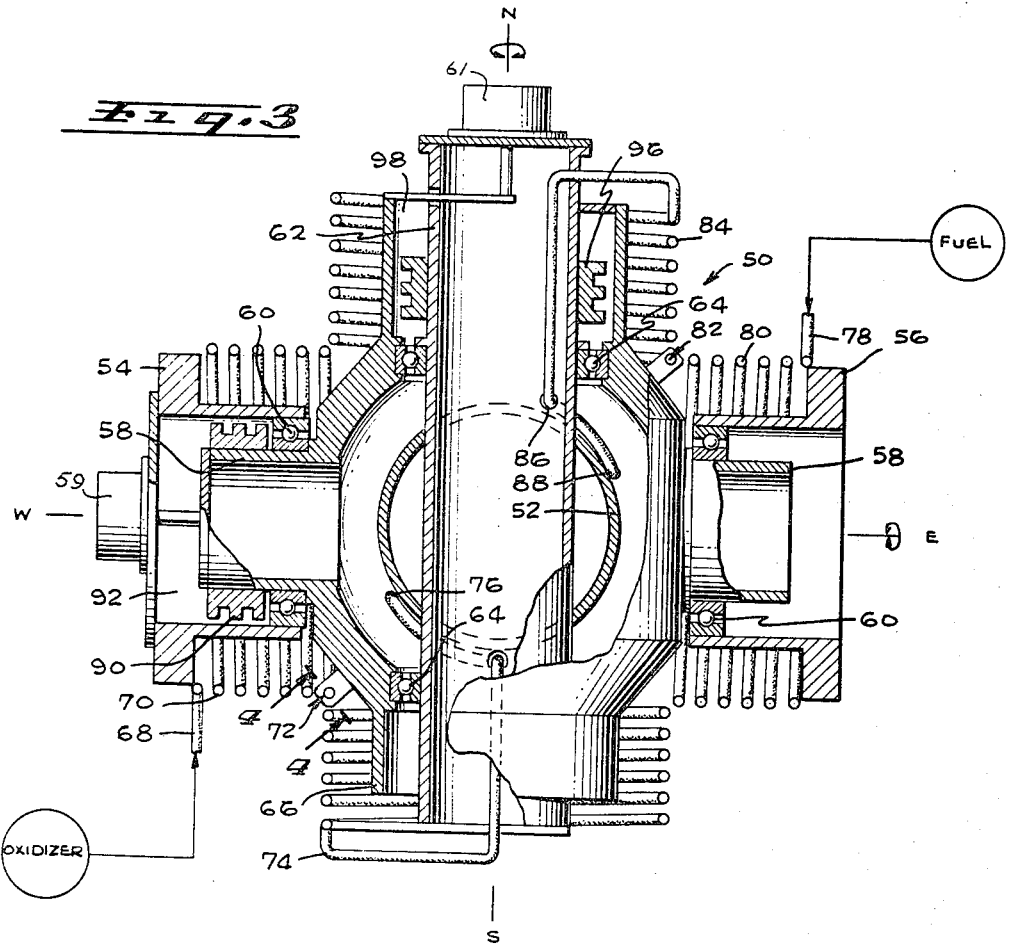
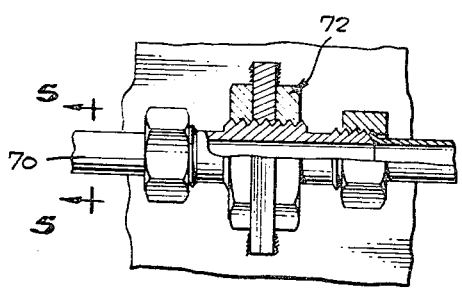

United States Patent Office 3,408,861
Patented Nov. 5, 1968

3,408,861
ROCKET ENGINE THRUST VECTOR DEVIATION
MEASUREMENT DEVICE
James E. Webb, Administrator of the National Aeronautics and Space Administration with respect to an invention of Herbert Shieber, Beverly Hills, and Kirke Leonard, Palos Verdes Estates, Calif.
Filed Sept. 9, 1966, Ser. No. 578,927
6 Claims. (Cl. 73—117.4)

ABSTRACT OF THE DISCLOSURE

The thrust deviation vector of a rocket engine is determined by supporting an arm vertically on gimbal supports. The rocket engine is attached to the lower end of the arm. The arm is weighted so that the center of gravity is below the gimbal support. The arm moves when the rocket engine is fired until the moment of the support arm equals the moment due to the lateral component of thrust. This can then be measured.

---

The invention described herein was made in the performance of work under a NASA contract and is subject to the provisions of Sec. 305 of the National Aeronautics and Space Act of 1958, Public Law 85–568 (72 Stat. 435; 42 USC 2457).

This invention relates to a measurement of thrust vector deviation of rocket engines or other force producing devices.

More particularly, this invention relates to the measurement of thrust deviation of a rocket engine wherein the thrust vector can be accurately determined by means of position measurement rather than force measurement.

In the design, development, constructing and testing of rocket engines for use in space travel, it is necessary that the direction of thrust of the engine be accurately determined. This deviation can either be accounted or compensated for by mounting the engine such that the true thrust vector produced by the engine is in the desired direction. It is necessary therefore that testing devices be provided to accurately determine the true thrust vector. One method of determining the thrust vector of a rocket engine is to provide a load cell which measures the thrust in the axial direction of the engine and to provide supplemental load cells in the other direction. A typical way would be to have load cells in the x-direction, the y-direction and the z-direction. When the engine is fired, the measurement of each of the load cells are correlated, computed and the true thrust vector determined. This however, suffers a disadvantage in that the load cell which measures the primary direction of thrust takes the full brunt of the force while the cells measuring thrust in the other direction have a relatively small component of thrust directed on the load cells. In addition, provision for at least three load cells renders the resultant test facility complex. In addition, typical load cells are subject to drift, hysteresis and high cost.

One manner of obviating this problem is disclosed in the U.S. patent to Ormond No. 3,138,953. In this patent, there is disclosed a structure and method whereby the rocket engine is allowed to move axially and laterally such that lateral components of thrust can be measured. However, this system is relatively complex and in many respects suffer the same disadvantages of the aforementioned typical system of a plurality of load cells. Ormond overcomes the problem of hysteresis lost by providing flexible mounting assemblies for measurement of loads.

Another approach is disclosed in the U.S. patent to Manning No. 2,498,995. This system, however, is not primarily directed to the measurement of thrust deviation although the structure could be utilized as such. However, this system is complex and measures force rather than position.

Briefly, the invention correlates the thrust deviation vector of a rocket engine or the like by measuring the position of an element and converting this into readings of force deviation. Position indication is a relatively easy measurement to make and is more accurate than measurement of force. In one embodiment, the thrust deviation of a rocket engine due to lateral components of a thrust, move a support arm about a gimbal position. This movement occurs until the moment of the support arm equals the moment due to the lateral component of thrust. In another embodiment, the support arm to which the thrust of the engine is applied has a system of springs which are stressed to the point where the moment caused by stress in the springs equals that due to the thrust of the lateral component.

In still another embodiment, the two systems are combined whereby both weight and spring rate are correlated to indicate the lateral components of thrust.

It is an object of this invention to provide a new method of measuring thrust variation of a rocket engine or the like.

It is another object of this invention to provide an improved structure for measuring thrust deviation of a rocket engine or the like.

Other objects and advantages of this invention will become apparent as this description proceeds taken in conjunction with the drawings in which:

FIGURE 1 is a schematic view of a thrust measurement device constructed according to one embodiment of this invention;

FIGURE 2 is an enlarged view of a portion of the apparatus shown in FIGURE 1;

FIGURE 3 is a view of a portion of another embodiment of this invention shown partially in cross-section; and FIGURE 4 is a portion of the apparatus with parts broken away for clarity as viewed along the lines 4—4 of FIGURE 3.

Referring to FIGURE 1, there is shown one embodiment of this invention. A support indicated generally as 2 is provided upon which arms 4 and 6 extend upwardly therefrom. A vertical thrust transmitting member 8 is supported by gimbal 10. This gimbal 10 allows member 8 to rotate freely thereabout in any direction. Thus, member 8 can rotate in the direction of arrow 12 or in a direction normal thereto and to any angular position therebetween. A rocket engine 14 is mounted at one end of member 8 such that thrust produced by rocket engine 14 is exerted through member 8 to gimbal joint 10 and thence to arms 4 and 6 and support 2. Although not shown, a load cell may be provided in conjunction with arms 4 and 6 so as to measure the purely vertical force produced by engine 14. This vertical force component is shown by arrow 16. Preferably, this load cell would be located at 13. However, since the vertical component is so large relative to the horizontal component, it can be estimated with a large tolerance for margin of error. The estimated thrust is determined by the propellant flow rate and known specific impulse. A counterweight 18 is provided on the other end of member 8 and is adjustable upwardly or downwardly as shown by arrow 20 so as to change the center of gravity of member 8. The center of gravity is maintained below gimbal 10.

When rocket engine 14 is fired, there is a possibility that the direction of thrust is not in the direction of arrow 16 but could for example be in the direction of arrow 22. In this case, the direction of force represented by arrow 22 resolves itself into components represented by arrow 16 and arrow 24. It is this deviation 24 which is to be determined, such that by resolving components 16 and 24, the true direction and magnitude of thrust 22 can be determined.

To accomplish this, the counterweight 18 is adjusted such that the center of gravity is preset to the desired position. When the engine is fired, since the true direction of thrust is in the direction of arrow 22, rocket engine 14 and member 8 tends to rotate to the right. This is resisted by the weight of the system exerted through the center of gravity such that eventually a counterbalancing moment is provided and the system is at rest at a certain deviation angle. By measuring this angle, the position can be determined and by correlating the weight of the system and thrust measurement, the true direction of thrust 22 can be determined.

Shown more clearly in FIGURE 2 is a portion of the apparatus of FIGURE 1. Oxidizer is fed into conduit 30 from a source not shown and passes in a spiral path as shown at 32 and thence into the center of the gimbal at 34 and down the propellant line 36 to engine 14. In a similar manner, fuel is fed into conduit 38 passing in a spiral path as shown at 40. If desired, both the fuel and oxidizer line can be likewise spiraled as shown at 42. Fuel passes through line 44 into engine 14 for combustion with the oxidizer.

In the structure shown in FIGURE 2, the propellant lines are shown as passing through the center of the gimbal such that no spring action occurs in the propellant line which would tend to resist movement of member 8. In this case, the indication or measurement of thrust deviation is determined solely by movement of the arm which is resisted by the weight thereof resulting in an equilibrium position.

Sensors 5 and 7 are provided in conjunction with the gimbal joint to indicate position of arm 8. These sensors may take the form of position potentiometers which are well known in the art.

FIGURE 3 is illustrative of another embodiment of this invention and is shown in cross-section to illustrate the internal portions thereof. The gimbal and associated structure is designated generally at 50 and supports vertical thrust transmitting member 52 to which the engine is attached. Support arms 54 and 56 surround and enclose the ends of gimbal rod 58. Rod 58 is supported within support arms 54 and 56 by means of bearings 60. In a similar manner, hollow support rod 62 is supported by means of bearings 64 on portion 66 of support arms 54 and 56. This allows support rod 62 to rotate within portion 66 of arms 54 and 56.

Oxidizer is led through conduit 68 in a spiral path as shown at 70 and then attached to bracket 72 as more clearly brought out in FIGURE 4. The conduit or oxidizer line 68 then proceeds in a spiral path and as shown at 74 passes downwardly through hollow support rod 62 and then partially about member 52 as shown at 76. The oxidizer line then proceeds to the engine in a manner similar to that of FIGURE 1 or FIGURE 2. In a similar manner, fuel is introduced into conduit 78 and through a spiral path 80 to bracket 82 and then in a spiral path as shown at 84 downwardly through rod 62 as shown at 86 and in a manner similar to oxidizer line 76 proceeds downwardly at 88 to the rocket engine which is located at the bottom of the member 52.

Damping means are provided which may comprise blades 90 as shown on rod 58. These blades 90, when member 52 is rotated, work against a viscous fluid contained in cavity 92. This prevents rod 58 from rotating rapidly or from hunting or oscillating about a point. In a similar manner, rod 62 has blades 96 thereon which likewise rotate against a viscous fluid in cavity 98.

By arranging the propellant lines in a spiral path about the respective rods, and by running the propellant lines down the side of member 52, a spring force is exerted on the propellant lines when member 52 rotates about the gimbal. This spring force can be readily calibrated and measured such that the thrust deviation caused by the rocket engine will be exerted against the spring and by measuring, by means of sensors 59 and 61, the position of the member 52, the force or thrust variation can be readily determined.

It is also within the realm of this invention to combine the two types of measurement. Thus, a thrust deviation measurement device can combine the features of spring measurement in addition to the measurement of the change of the center of gravity which can be adjusted through an adjustable counterweight as in the embodiment of FIGURE 1.

In operation, when the engine is fired using any of the embodiments of this invention, should there be any thrust deviation, the support arm will rotate about the gimbal joint and since the movement of this arm can be readily correlated with the gravity forces through the center of gravity and for the spring rate which is likewise calibrated to movement, the lateral component of thrust is readily determinable and the direction of thrust deviation known.

Having described this invention, it is to be understood that it is to be limited only by the scope of the claims appended hereto.

What is claimed is:

1. A device for measuring thrust vector deviations of a rocket engine comprising:
   a support arm supported by a gimbal joint allowing said arm to pivot freely thereabout with said arm's center of gravity located below said joint;
   means for mounting a rocket engine at the lower end of and coaxially to said support arm;
   means for applying the thrust of said rocket engine to said arm at a location below said joint; and
   means for measuring the angular displacement of said support arm about said joint by application of said thrust to provide an indication of the lateral force applied to said support arm.

2. A device as defined in claim 1 having means to vary the location of said arm's center of gravity and therefore the sensitivity of said measuring means.

3. A device for measuring thrust vector deviations of a rocket engine comprising:
   a support arm supported by a gimbal joint allowing said arm to pivot freely thereabout;
   bias means for biasing said arm to a vertical direction with a known force;
   means for mounting a rocket engine at the lower end of and coaxially to said support arm;
   means for applying the thrust of said rocket engine to said arm at a location below said joint; and
   means for measuring the angular displacement of said support arm about said joint by application of said thrust to provide an indication of the lateral force applied to said support arm.

4. A device as defined in claim 3 wherein said bias means comprises said support arm having its center of gravity below said gimbal joint.

5. A device as defined in claim 3 wherein said bias means comprises spring means operative on said arm.

6. A device as defined in claim 5 wherein said spring means comprise propellant lines.

References Cited

UNITED STATES PATENTS

| | | | |
|---|---|---|---|
| 1,447,185 | 3/1923 | Sammet | 73—142 X |
| 2,472,108 | 6/1949 | Hickman | 73—141 |
| 2,498,995 | 2/1950 | Manning | 73—117.4 |
| 2,774,241 | 12/1956 | Bennett | 73—117.4 |
| 3,122,917 | 3/1964 | Ormond | 73—117.4 |
| 3,264,869 | 8/1966 | Erdely | 73—189 |

RICHARD C. QUEISSER, *Primary Examiner.*

JERRY W. MYRACLE, *Assistant Examiner.*